April 14, 1970   J. J. PESTA   3,505,694
COMBINATION LOVE SEAT AND BED
Filed April 16, 1968   4 Sheets-Sheet 1

INVENTOR.
Joseph J. Pesta
BY
Polachek & Saulsbury
ATTORNEYS

April 14, 1970 J. J. PESTA 3,505,694
COMBINATION LOVE SEAT AND BED
Filed April 16, 1968 4 Sheets-Sheet 2
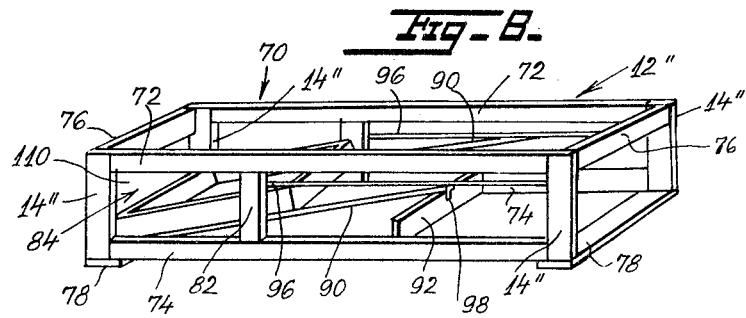
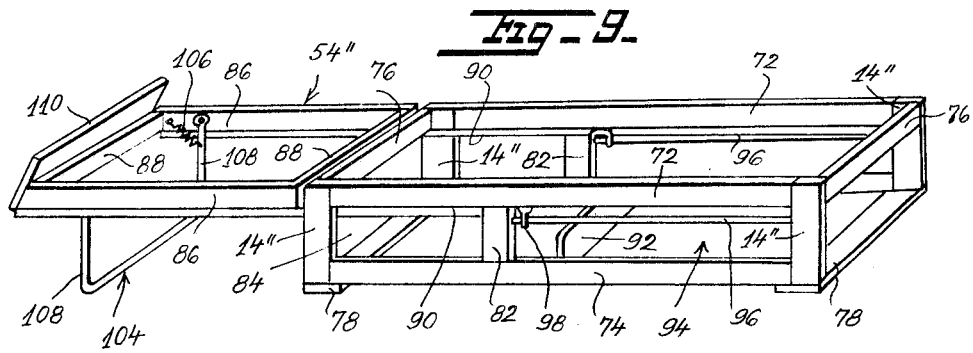
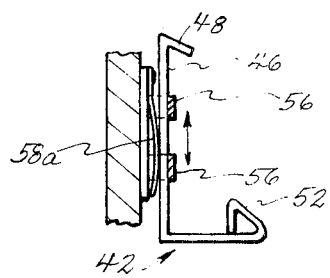
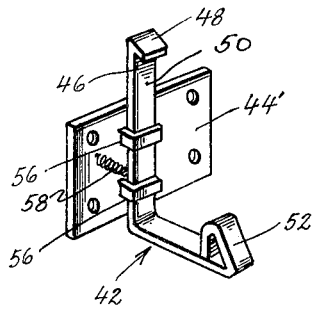
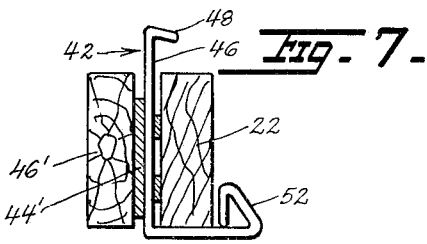
INVENTOR.
Joseph J. Pesta
BY
Polachek & Saulsbury
ATTORNEYS

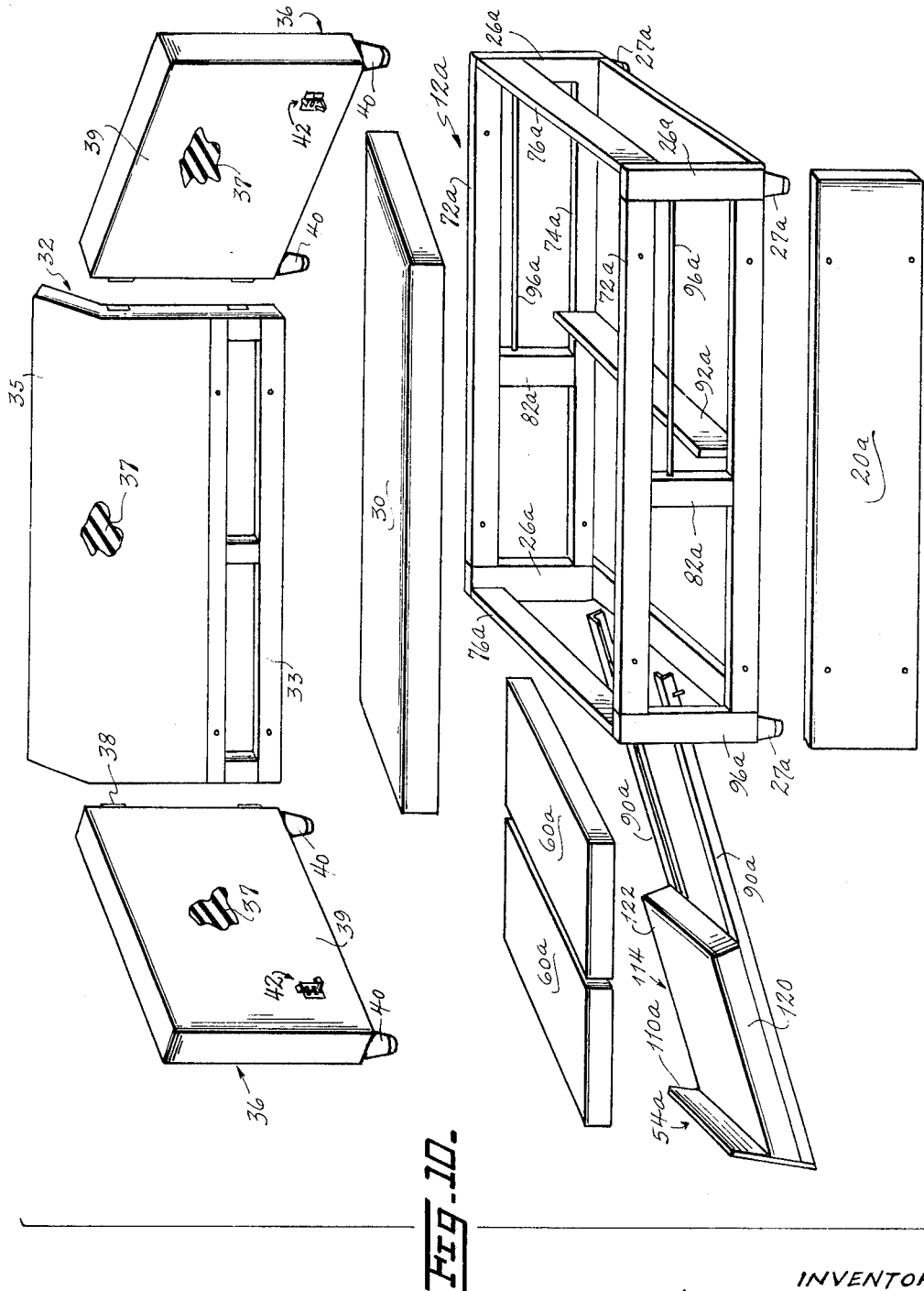

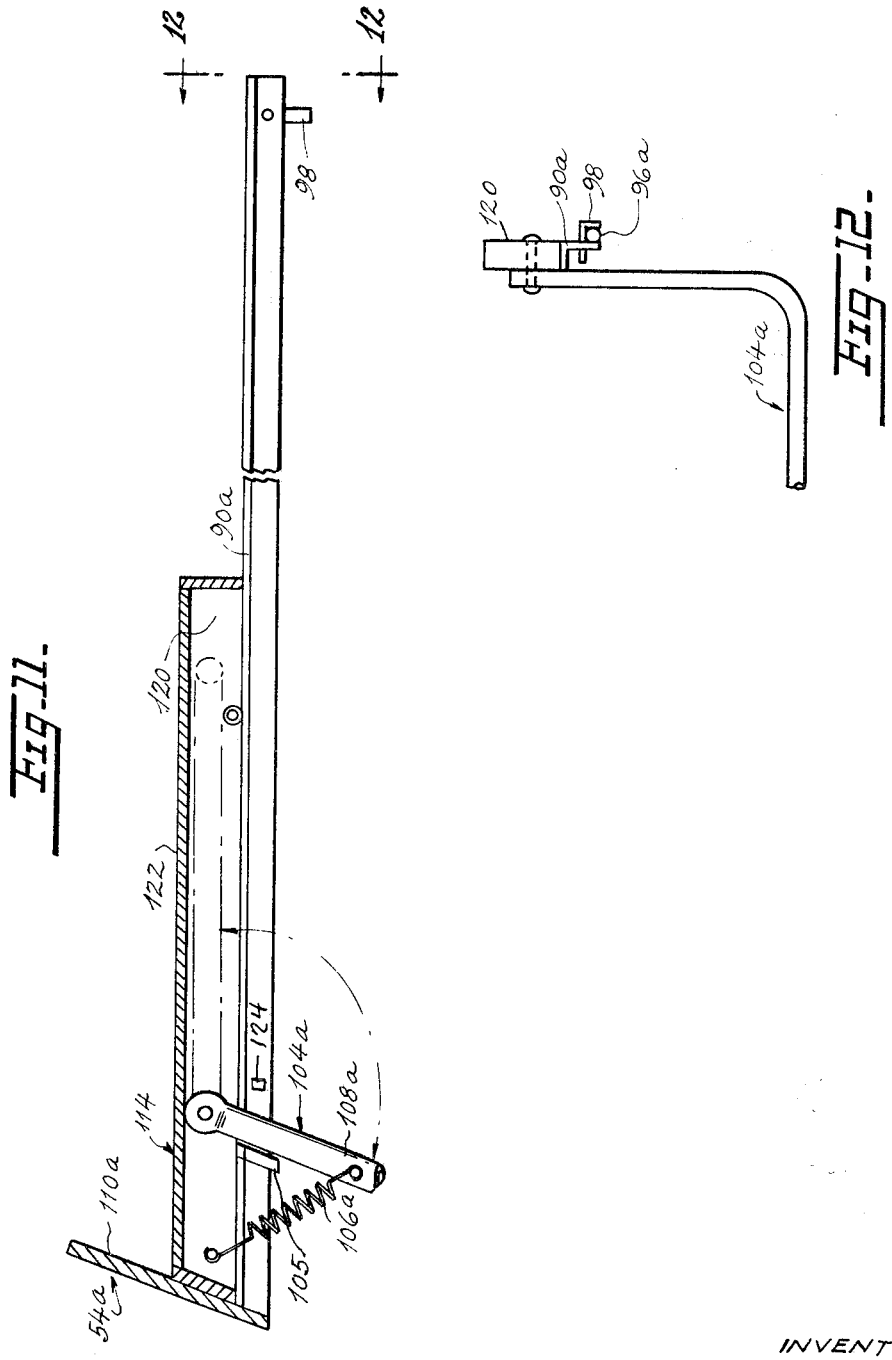

United States Patent Office 3,505,694
Patented Apr. 14, 1970

3,505,694
COMBINATION LOVE SEAT AND BED
Joseph J. Pesta, 6333 Jacksonville Road,
Ocala, Fla. 32670
Filed Apr. 16, 1968, Ser. No. 721,830
Int. Cl. A47c 19/04
U.S. Cl. 5—17                                    3 Claims

ABSTRACT OF THE DISCLOSURE

A combined love seat and bed having a main hollow fixed seat rectangular in configuration enclosed at the rear and sides by a frame. The sides of the frame are constituted by a swingable arm rest. An extension seat is slidably mounted in the main seat and when one of the arm rests is swung away from the frame, said extension seat is adapted to slide outwardly of the main seat forming an extension thereof for supporting the legs of the user. A U-shaped member carried by the extension seat supports the extension seat in extended position. The main set is covered at its front and top by upholstery and removably cushions are placed on the top upholstery at the rear thereof.

---

This invention relates to combination love seat and bed and this invention is a new and useful improvement over the disclosure in my Letters Patent No. 2,489,105.

More particularly the invention proposes a new and improved combination love seat and bed which is characterized by an extension frame obliquely disposed within a box-like frame and having its foot end slidably and pivotally mounted upon tracks mounted along the front portions of the sides of said box-like frame and having its head end at the bottom portion of the foot of said box-like frame.

The invention also proposes that the various frames be provided with the usual upholstery or other covering material. Cushions also are provided.

Still further, the invention contemplates the construction of a combination love seat and bed which is simple and durable and which may be manufactured and sold at a reasonable cost.

FIG. 5 is a detail view of the latching device for the arm structure.

FIG. 6 is a perspective view of a modified form of latching device.

FIG. 7 is a part-elevational and part-sectional view thereof in operative position.

FIG. 8 is a perspective view of a combined love seat and bed embodying a first modified form of the invention with the upholstery and covering removed so as to disclose the interior construction.

FIG. 9 is a view similar to FIG. 8 showing the foot extension in extended upper position.

FIG. 10 is a disassembled perspective view of a combined love seat and bed embodying a second modified form of the invention.

FIG. 11 is a vertical sectional view through the center of the foot extension, the extension being shown in extended upper position, parts being shown broken away.

FIG. 12 is a view as seen from the line 12—12 of FIG. 11.

Figure 1:
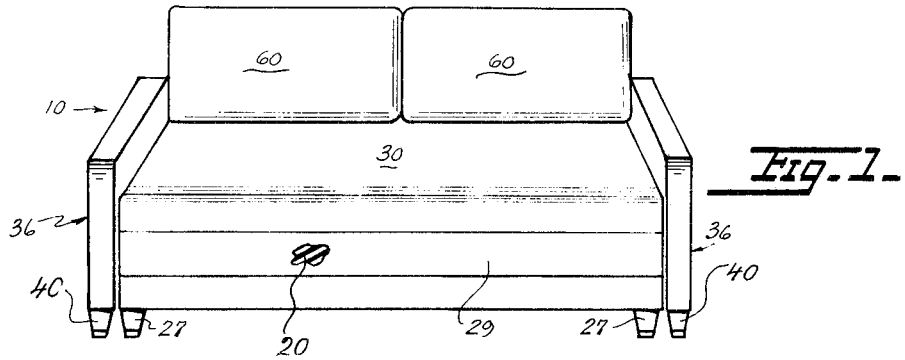
FIGURE 1 is a front perspective view of a combined love seat and bed in closed position embodying one form of the invention.

Referring now in detail to the various views of the drawings, a combined love seat and bed embodying one form of the invention is illustrated and is designated generally at 10. The combined seat and bed comprises a rectangular main seat frame 12 having front and rear lower bars 14 and 16, respectively, a front panel 20, on top of the front lower bar 14, and bars 22, 22 at the top of the frame, a floor 24 extending across the space between the bottom front and rear bars. The bars and floor are joined by corner posts 26, which posts are supported on feet 27. The front panel 20 is covered with upholstery 29. The main frame is open at both ends. An elongated rectangular shaped cushion 30 is removably supported at the top of the frame. The cushion serves as a seat.

An auxiliary frame 32 is positioned behind the main frame and is suitably secured thereto, extending thereabove. The frame comprises a panel 33 at the top end of which slats outwardly slightly as indicated at 34. An elongated bar 33 extends along the bottom of the panel 33 (see FIG. 10). Panel 33 is covered with upholstery 35. An arm structure 36 in the form of a rectangular panel 37 is swingably fixed to each end of the auxiliary frame by means of hinges 38. The panel is covered with upholstery 39. A foot 40 depends from the bottom of the panel 36 adjacent each end thereof.

The panels 37, 37 are each equipped on the inner surface thereof with a latching device 42 slidably supported in the outstruck portion of a strap 44 suitably fixed on the surface of the panel. Each device 42 consists of an L-shaped bar 46 having a flange 48 at one end of one leg 40, serving as a handle and having a hook on the free end of the other leg for snapping over the adjacent end bar 22 of the main frame 12 for holding the arm structure 36 in position against the main frame 12 and closing the opening at the end of the frame. In place of the strap 44, the latching device 42 may be slidably supported by a perforated plate 44′ formed with spaced outstruck portions 56, 56 as shown in FIG. 6 and FIG. 7. A compression spring 58 pulls the latching device upwardly against the seat frame holding it in locked position. A pair of cushions 60, 60 is removably supported on the seat 30 against the auxiliary frame 32.

Figure 2:
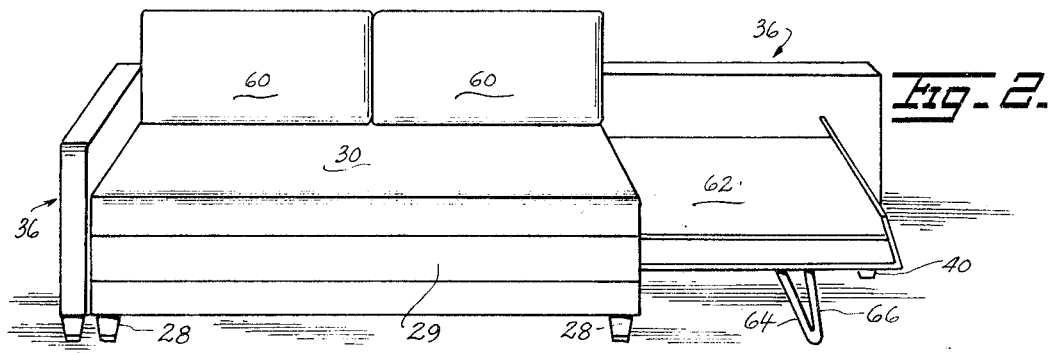
FIG. 2 is a similar view in open position.

In accordance with the invention, an auxiliary seat or foot extension 62 is slidably supported inside the main seat frame 12 and is adapted to be slid through the opening at one end thereof, the right-hand end as viewed in FIG. 2. The auxiliary seat or platform 62 is equipped with a U-shaped metal tubular support 64, with the ends of the legs 66 thereof hinged to the under side of the auxiliary seat for supporting the auxiliary seat in extended position as shown in FIG. 2.

Figure 3:
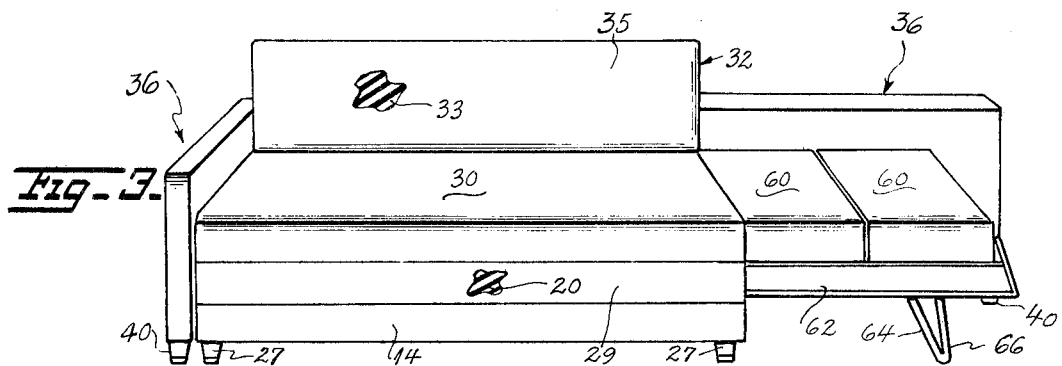
FIG. 3 is a view similar to FIG. 2 showing the back cushions removed and placed on the foot extension.
Figure 4:
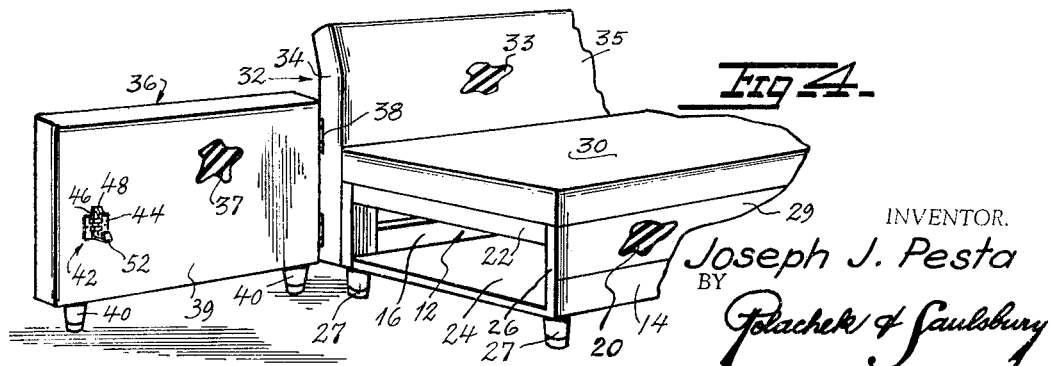
FIG. 4 is a front perspective view of the left hand end of the combined love seat and bed of FIG. 1, showing one arm structure swung to open position.

In use, when it is desired to convert the main seat frame 12 into a bed, the arm structures 36, 36 are swung outwardly to become aligned with the auxiliary frame panel 32 as shown in FIGS. 2, 3 and 4, whereupon the end of the auxiliary seat 62 is grasped by the hand and pulled outwardly through the adjacent open end of the main frame 12. The U-shaped support 64 is then swung downwardly to auxiliary seat supporting positions as shown in FIGS. 2 and 3. The back cushions 60, 60 are then removed and placed flatwise on the top surface of the auxiliary seat 62 thereby providing a flat and comfortable surface for the legs of the person sleeping on the main seat.

In FIGS. 8 and 9, a modified form of frame 12″ for a main seat and a modified form of end extension or auxiliary seat 62″ are shown. The auxiliary rear frame and end arm structures are not shown. The main frame 12 consists of a rectangular shaped body with front and rear top and bottom bars 72 and 74, respectively, and top and bottom end bars 76 and 78, respectively, the bars being joined to each other by upright corner posts 14". The top and bottom front and rear bars are joined intermediate the ends thereof by upright posts 82. The frame 12" is open at both ends and the ends are adapted to be closed by the arm structures such as the arm structures 36 of FIG. 1.

The foot extension or auxiliary seat 62" is stored in the main frame 12" at its open end 84. The extension or auxiliary seat frame when stored is disposed at a slightly angle to the horizontal and comprises side bars 86, 86 joined by end bars 88, 88. A pair of elongated bars 90, 90 radiate from the inner ends of the side bars 86, 86 and extend over the top of a partition wall 92 between the bottom side bars intermediate the ends thereof, thereby forming a compartment 94. A pair of guide rods 96, 96 extend under and along the top front and rear front bars 72 and from the corner posts 14" at the right hand end of the frame as viewed in FIG. 9 to the intermediate upright posts 82. An angular bracket member 98 is carried on the inner free end of each bar 90 and extends laterally thereof. Each bracket is formed with a loop portion slidable along the adjacent guide rod 96, guiding the movement of the extension and auxiliary seat frame and limiting its outward movement, the bracket being adapted to contact the intermediate post 82 and prevent farther outward movement of the extension or auxiliary seat frame. A tubular U-shaped metal member 104 is hingedly attached to the inner surface of the opposed side bars 86 of the extension or auxiliary seat frame. A spring 106 having one end secured to the inner surface of one side bar 86 and its other end anchored to the adjacent leg 108 of the U-shaped member urges the U-shaped member to open position. A panel 110 is fixed on the outer surface of the outer end wall 88 of the auxiliary frame, the panel extending above the top of said outer end wall for closing the opening 84 in the adjacent end of the main frame.

In practicing with form of the invention, the top and sides of the main frame 12" will be covered by upholstery covering similar to the upholstery covering of the main seat 12 of FIG. 1. Bedding may be inserted through the end of the main frame when the arm structure is open for storage in the compartment 94. The foot extension or auxiliary seat frame 62" is pulled out manually by grasping the panel 110 to the position shown in FIG. 9 lever with the guide rods 96 and the U-shaped member 104 is then swung downwardly to the supporting position of FIG. 9. When the foot extension or auxiliary seat frame is in this extended position, pillows or cushions may be placed on a plywood panel seated on the side bars 86, 86 of the auxiliary frame for the legs of the sleeper.

FIGS. 10 to 12, inclusive, illustrate still another modified form of the invention. Herein the main frame 12a is rectangular in shape with upper front and rear bars 74a and end bars 76a, the bars being connected by corner posts 26a. The corner posts are supported on supporting feet 27a. The upper and lower and rear bars are joined by center posts 82a. A partition wall 92a extends across the space between the lower bars 74a, to one side of the center posts 82a. The main frame 12a is open at both ends. An upholstered panel 20a is adapted to be fixed to the front side of the main frame for finishing off the front side.

In this form of the invention, the foot extension comprises a pair of elongated angle irons 90a, 90a supporting an upright panel 110a on the outer end thereof. A leg support in the form of an inverted box-like member 114 with side walls 120 and top wall 122 and being open at the bottom is suitably fixed on the top surfaces of the angle irons. A U-shaped frame supporting member 104a similar to member 104 is hingedly attached to opposed side walls 120 and is urged to open frame supporting position by a spring 106a having one end fixed to one of the side walls 120 and its other end anchored to one leg 108a of the U-shaped member. A downwardly protruding member 105 engages one of the legs of the U-shaped frame supporting member 104a and stops outward swinging movement of said member 104a. A rubber protuberance 124 protruding inwardly from the inner surface of the side wall mounting the spring 106a serves as a stop to limit movement of the U-shaped member 104a. Cushions 60a, 60a are supported on the top wall 122 of the leg support 114.

The auxiliary back frame 32 and arm structures 36, 36 enclose the back and sides of the main seat frame 12a as in the combined seat and bed of FIG. 1, and the main seat frame 12a and foot extension function similarly to the main seat and foot extension of FIG. 1, and similar reference numerals are used to indicate similar parts in both auxiliary back frames and arm structures.

What is claimed is:
1. In a combined love seat and bed, a main fixed hollow seat rectangular in configuration, an auxiliary seat within said main seat and slidable outwardly thereof, and a support carried by the auxiliary seat for supporting the auxiliary seat in extended position, said main fixed hollow seat comprising a main frame and an elongated removable cushion on said frame, an auxiliary frame at the back of the main frame extending above the main frame, said auxiliary frame being covered with upholstery, arm structures on the opposite ends of the main frame, and at least one of the arm structures being hingedly connected to one end of the auxiliary back frames, from which the auxiliary seat is slidable to close the open end of the main frame, said auxiliary frame comprises a panel covered with upholstery and wherein the arm structures each comprises a panel covered with upholstery, and feet on the arm structures for supporting the same on a supporting surface, and latching means carried by the panels of the arm structures for yieldably holding the arm structures in closed position.

2. A combined love seat and bed as defined in claim 1 wherein the latching means including a strap fixed on the panel of the arm structure, said strap having an outstruck portion, an L-shaped bar slidably in said outstruck portion, a flange at one end of the leg of the bar serving as a handle and a hook at the end of the other leg serving to hook over a stationary port of the main frame for holding the arm structure in closed position.

3. A combined love seat and bed as defined in claim 1 wherein the latching means includes a plate fixed on the panel of the arm structure, said plate having spaced outstruck portions, an L-shaped bar slidably in said outstruck portions, a flange at one end of one leg of the bar serving as a handle and a hook at the end of the other leg serving to hook over a stationary part of the main frame for holding the arm structure in closed position.

References Cited
UNITED STATES PATENTS

| | | | |
|---|---|---|---|
| 2,211,450 | 8/1940 | Wesley | 5—17 |
| 2,489,105 | 11/1949 | Pesta | 5—17 |
| 2,503,543 | 4/1950 | Caston | 297—194 |

CASMIR A. NUNBERG, Primary Examiner

U.S. Cl. X.R.

5—185